V. W. BLANCHARD.
Lamp-Chimneys.

No. 154,011 — Patented Aug. 11, 1874.

WITNESSES:
P. C. Dieterich
J. B. Bahn

INVENTOR
Virgil W Blanchard
per J. H. Alexander
ATTORNEY.

UNITED STATES PATENT OFFICE.

VIRGIL W. BLANCHARD, OF WEYBRIDGE, VERMONT.

IMPROVEMENT IN LAMP-CHIMNEYS.

Specification forming part of Letters Patent No. 154,011, dated August 11, 1874; application filed January 2, 1874.

*To all whom it may concern:*

Be it known that I, VIRGIL W. BLANCHARD, of the town of Weybridge, in the county of Addison and State of Vermont, have invented certain new and useful Improvements in Lamp-Chimneys; and I do hereby declare that the following is a full, clear, and exact description thereof, reference being had to the accompanying drawings and to the letters of reference marked thereon, which form a part of this specification.

The object of this invention is to provide, by one or more series of corrugations in its wall, a lamp-chimney that will not easily be fractured by the effects of contraction and expansion resulting from a sudden variation of temperature. Also, to provide a chimney whose wall shall possess the greatest amount of strength and elasticity, and thereby prevent, to a great extent, its fracture from careless handling.

In order to enable others skilled in the art to which my invention appertains to make and use the same, I will now proceed to describe its construction and operation, referring to the annexed drawing, in which—

Figure 1:
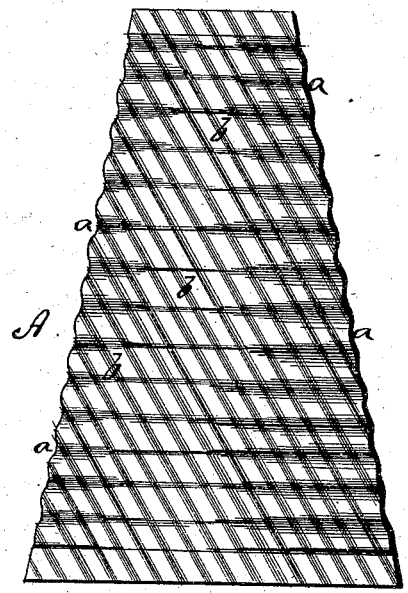
Figure 2:
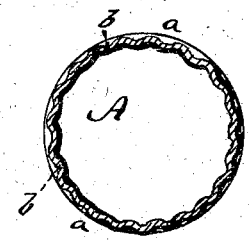

Figure 1 is a side elevation of a lamp-chimney embodying my invention, and Fig. 2 is a horizontal section of the same.

A represents a glass lamp-chimney, made of any suitable or desired form or shape, and provided with two series, $a\ a$ and $b\ b$, of corrugations running at an angle with each other. The object hereof is to give room in the curves of the corrugations for the elasticity of the glass to find free play.

Glass is very elastic, and when room is given by the suitable arrangement of curves in the wall exposed, breakage from the effect of heat and cold becomes almost impossible. Also, by means of the corrugations greater strength is given to the chimney.

The corrugations may be of any depth desired, and may be single or double.

The series $a$, running around the chimney, would alone prevent its breakage in a longitudinal direction, but not in the direction of the line of corrugations. The series $b$, running longitudinally, will prevent breakage in a line running around the chimney. Hence the necessity of having two series running at an angle with each other is apparent.

I am well aware that lamp-chimneys have been constructed or formed with external corrugations, and, therefore, lay no claim to this feature alone; but What I do claim, and desire to secure by Letters Patent, is as follows:

A lamp-chimney whose wall is of uniform thickness, having corrugations, crossing each other, for the purpose of developing the elasticity of the glass when subjected to different degrees of heat or cold, substantially as set forth.

In testimony that I claim the foregoing as my own I affix my signature in presence of two witnesses.

VIRGIL W. BLANCHARD.

Witnesses:
 THOMAS H. MCLEOD,
 MARTHA MCLEOD.